SYNCHRONISING ARRANGEMENTS IN DIGITAL COMMUNICATIONS SYSTEMS

Filed Oct. 3, 1968 3 Sheets-Sheet 1

Norman West
Inventor

By Hall, Pollock & Vande Sande
Attorney

Norman West
*Inventor*

By
Hall, Pollock & Vande Sande
*Attorney*

Sept. 29, 1970 N. WEST 3,531,777

SYNCHRONISING ARRANGEMENTS IN DIGITAL COMMUNICATIONS SYSTEMS

Filed Oct. 3, 1968 3 Sheets-Sheet 3

Norman West
Inventor

By
Hall, Pollock & Vande Sande
Attorney

United States Patent Office 3,531,777
Patented Sept. 29, 1970

3,531,777
SYNCHRONISING ARRANGEMENTS IN DIGITAL COMMUNICATIONS SYSTEMS

Norman West, Christchurch, Hampshire, England, assignor to Minister of Technology in Her Britannic Majesty's Government of the United Kingdom of Great Britain and Northern Ireland, London, England Filed Oct. 3, 1968, Ser. No. 764,818
Claims priority, application Great Britain, Nov. 21, 1967, 52,999/67; Feb. 28, 1968, 9,613/68
Int. Cl. H04j *3/06, 7/04*
U.S. Cl. 340—172.5 8 Claims

ABSTRACT OF THE DISCLOSURE

To avoid corruption of digital messages in a complex communications system, it is desirable to write incoming messages into separate buffer stores at each exchange. Inputs to the buffer stores are synchronised with the various incoming messages, while subsequent message transfers and transmissions are synchronised with a local oscillator at each exchange.

Figure 1:
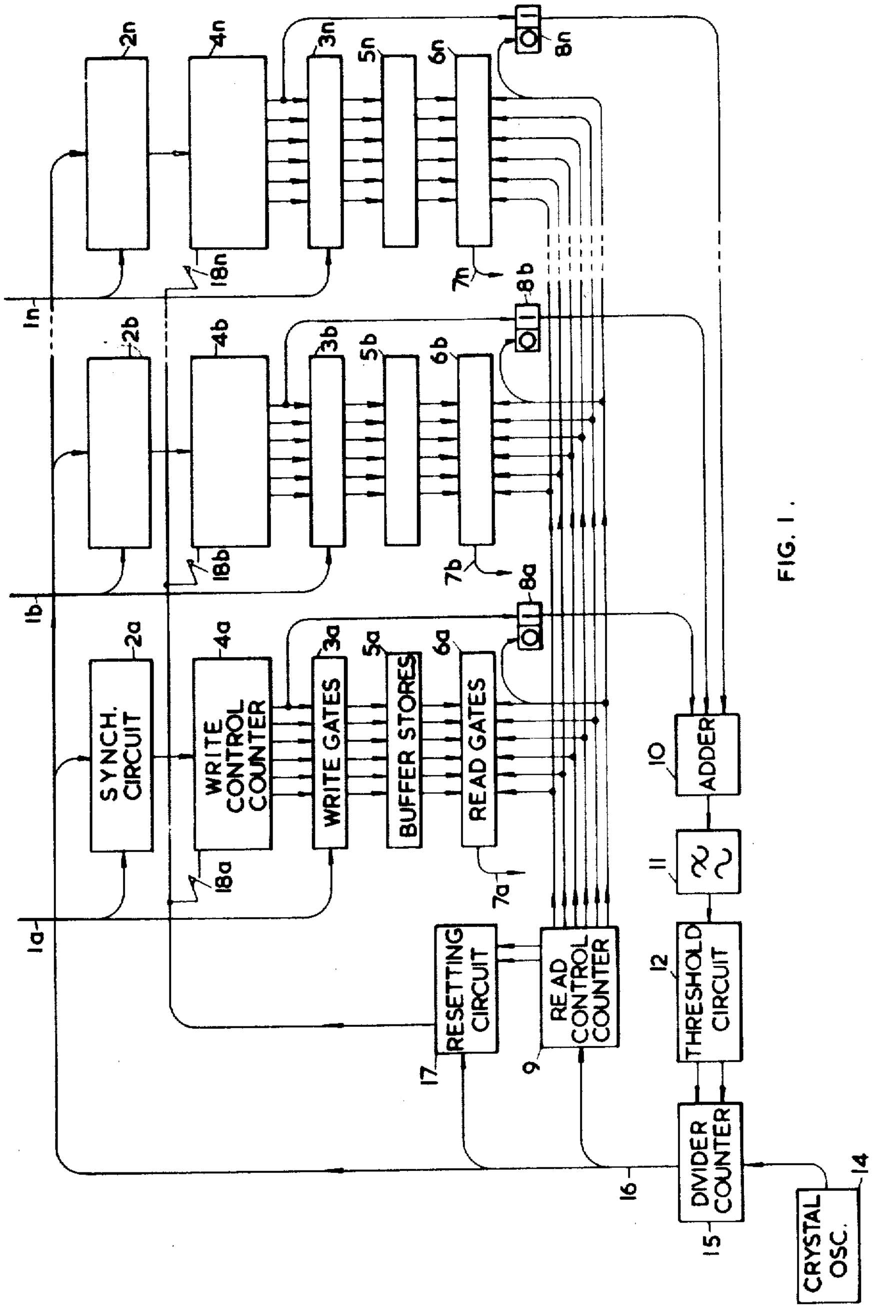

Apparatus is described for controlling the local oscillators in a non-linear and bounded manner to ensure a satisfactory relationship between writing and reading operations at each buffer store in the system, and advantages of the arrangement are explained.

The present invention relates to synchronising arrangements in communications systems for transmitting digial signals.

Complex communications systems with many interconnections between a plurality of exchanges or relay stations provide a multitude of routes over which signals may be directed. It is desirable to retain the signals in the same form throughout their journeys, in order to keep the equipment for transferring and switching the signals at each exchange as simple as possible. However, when the signals are in digital form, switching operations at any exchange can corrupt the signals, causing omissions or repetitions of digit-signals unless suitable arrangements are made. Corruption is particularly likely if different signals are transmitted in time-division multiplex over parts of their routes. In its practically convenient to control the digit-signal rate of signals generated at, or transmitted from, each exchange by a local oscillator. Although the local oscillators will have the same nominal frequency, they will in practice tend to have frequencies distributed over a range of frequencies, so that signals from different sources will be received at various slightly different digit-signal rates. In such systems, it is usual to write the signals received on each incoming route cyclically into the storage location of a buffer store, and then read them out cyclically for re-transmission. The writing process is synchronized with the digit-signal rate of the incoming signals, while the reading process and retransmission of the signals are controlled by the local oscillator at each exchange. The reading and writing processes should be at the same nominal digit-signal rate, and preferably phased so that in a buffer store having $2n$ discrete storage locations, a signal is being written into the first storage location while another signal is being read out from the $(n+1)$th storage location. However, where the input signal rate is faster than the local oscillator rate, the writing operations may overtake the reading operations so that some signals will be altered before they are read out. Conversely, where the input signal rate is slower that the local oscillator rate the reading operations may overtake the writing operations so that a sequence of signals will be read out a second time.

Such corruptions can, of course, be avoided by synchronising the operations at all the exchanges with signals from a master oscillator. However, this makes the operation of all parts of the system dependent on the satisfactory reception of the master oscillator signals, which is inconvenient and in many applications may be considered unacceptable. Arrangements for transferring control to a secondary standard oscillator, or if necessary down a hierarchy of oscillators, have been suggested, but they are very complicated.

Systems have been suggested wherein operations at and transmissions from each exchange are synchronised with the average of the frequencies of the operations at all the other exchanges. It can be provided that such systems will tend to settle to an equilibrium frequency which will depend on the initial phase differences between the operations at the various exchanges of the system at the instant when the system starts to operate, and on the time constant of the synchronising arrangements at each exchange. In practice the synchronising arrangements will only be capable of satisfactory operation over a limited range of frequencies. To ensure that the equilibrium frequency will lie within this limit range of frequencies it may be necessary to control or adjust the phase of the local oscillator at each exchange before connecting its outputs to the system. Moreover, in such systems it is necessary to limit the speed of response of the synchronising arrangements in order to avoid deterioration of the signal-to-noise ratio.

It is an object of the present invention to provide a system wherein local operations at and transmissions from each exchange are controlled by a non-linear control arrangement which restricts the digit-signal rates to a specified range.

According to the present invention there is provided synchronising apparatus for an exchange or relay station in a digital communications system, including a local oscillator circuit, writing means for writing the incoming signals into separate buffer stores at rates synchronised with the actual digit-signal rates of the various incoming signals, reading means for reading the signals from the buffer stores at a rate controlled by the output of the local oscillator circuit, a plurality of phase discriminator circuits each arranged to produce a phase error signal dependent on the phasing of an incoming signal relative to the output of the local oscillator circuit, means for averaging the phase error signal to produce an averaged error signal, and control means responsive to the averaged error signal for shifting the frequency of the local oscillator circuit, so as to tend to reduce the average error signal. The control means is preferably arranged to shift the frequency of the local oscillator circuit to different discrete frequencies according to the value of the average error signal.

The control means may include a threshold circuit connected to receive the average error signal and means responsive to the state of the threshold circuit for setting the frequency of the local oscillator circuit to a first frequency when the voltage of the average error signal is above the threshold voltage of the threshold circuit and for setting the frequency of the local oscillator circuit to a second frequency when the voltage of the averaged error signal is below the threshold voltage of the threshold circuit.

The local oscillator may include an oscillator for generating pulse signals at a repetition frequency at least four times greater than the nominal digit-signal rate of the signals to be transmitted, and a counter circuit arranged to be driven by the oscillator signals and connected to operate as a divider to produce pulses at a repetition frequency not greatly different from the nominal digit-signal rate of the signals to be transmitted, and the control means may include means for modifying the action of the counter circuit to alter the timing and repetition rate of its output pulses.

The control means may also include a multivibrator circuit arranged to operate at a predetermined frequency considerably less than the nominal digit-signal rate and connected to control the means for modifying the action of the counter circuit so as to modify the action of the counter circuit intermittently, at a rate controlled by the frequency of the multivibrator, either during periods when the voltage of the averaged error signal is greater than the threshold voltage of the threshold circuit, or alternatively during periods when the voltage of the averaged error signal is less than the threshold voltage of the threshold circuit, or to modify the action of the counter circuit in different ways in different periods according to the state of the threshold circuit.

The writing means may include a separate writing control counter circuit for each one of the buffer stores, each arranged to be driven by signals synchronised with the digit-signal rate of a separate incoming signal and having a plurality of outputs energised in a cyclic sequence, each output controlling signal access to a separate location of the buffer store; the reading means may include a reading control counter circuit arranged to be driven by the output of the local oscillator circuit and having a plurality of outputs energised in a cyclic sequence, each output controlling reading operations on a given location in each of the buffer stores; and a resetting circuit by which an output from the reading control counter may be used to reset any one of the writing control counters.

The apparatus may also include separate phase-locked tracking circuits for each incoming signal, for deriving signals synchronised with the digit-signal rates of the incoming signals.

To improve the signal-to-noise ratio, the incoming signals may be passed through gate circuits controlled by the synchronising circuits, the gate circuits being opened for short periods which should be synchronised with the middle of each incoming digit-signal. This cuts out a considerable proportion of the noise signals occurring near the crossovers and samples each digit-signal at or near its peak. To achieve the best possible signal to noise ratio, the synchronisation must be accurate. From this it can be deduced that the maximum range of acceptable digit-signal rates, and the maximum incremental change which can be tolerated in any digit-signal rate, should be related to the characteristics of the synchronising circuits (particularly their bandwidth or response time constant) and to the extent of any deterioration from the maximum obtainable signal-to-noise ratio which may be considered insignificant.

The number of storage locations required in each of the buffer stores depends mainly on the maximum range of the digit-signal rates, the maximum incremental change allowed in any digit-signal rate, and the time constant of the synchronising circuit.

In a system of the non-linear kind herein described, the speed of response of the synchronising arrangements is subject to less severe restrictions than are applicable to the previously known systems in which the oscillator frequencies are continuously variable and unlimited.

To follow the action, and possible developments of a non-linear system, it is desirable to consider first the action of a system in which each local oscillator is continuously variable over a limited range of frequencies. In such a system the oscillator frequencies will tend towards an equilibrium frequency until one of them reaches one of its limits. Because this frequency can follow the general trend no further, phase errors produced at each of the exchanges which receive signals from the exchange where the oscillator has reached its limit will increase. This changes in the averaged error signals and the oscillators controlled by them so that all the oscillators in the system tend to be brought to the limit frequency of the limited oscillator. The limited range over which each oscillator can operate should be greater than the tolerance on the nominal frequency of the oscillators, so that all the oscillators will be capable of operation at a common frequency. A system of this kind ensures that the frequency reached will lie in a specified range, but as it delays the attainment of the common frequency it requires buffer stores of larger capacity than those needed in a corresponding system with unlimited oscillator frequencies. This requirement can be offset by increasing the speed of response of the synchronising circuits, so that the oscillator circuits are driven more rapidly towards the limit frequency. This increase is possible because the limitation on the speed of response required to restrict the equilibrium frequency to an acceptable range when the oscillator frequencies are unlimited does not apply. When the speed of response is considerably increased, gradual frequency drifts and perturbations due to noise tend to switch the oscillator frequencies from one of the limit frequencies to another of the limit frequencies. The oscillators then operate for most of the time at one or the other of the limit frequencies, and operate at intermediate frequencies only transiently or not at all. This suggests that the oscillators can conveniently be made so that they can each operate at one or the other of two discrete frequencies. Because of the requirements that the range of oscillator frequencies in the system must be restricted (to enable the synchronising circuits to function well and to avoid deteriorations in the signal-to-noise ratio due to synchronisation errors) but also greater than the tolerance on the oscillator frequencies (so that each oscillator can be switched between its limits to give some output pulse rate which will be common to the whole system), a close tolerance on the operating frequencies of the oscillators is required. It is easier to make a suitable oscillator to operate at one or the other of two discrete frequencies than it is to make an oscillator which is continuously variable over a limited range. A convenient way to achieve the close tolerance required is to construct each oscillator from a high-frequency crystal oscillator circuit with a counting-down circuit. The crystal oscillators should all operate at the same nominal frequency within a very close tolerance (a tolerance of 1 part in 100,000 may be required). Arrangements for modifying the action of the counting-down circuits are provided, to achieve outputs each of which will provide pulses at one or the other of two discrete nominal frequencies.

When a system is set up with oscillators of this kind, the digit-signal rate of every signal transmitted will be switched from one to the other of the actual frequencies of the oscillator at the exchange from which the signal was transmitted. The switching will be controlled by the system so that the average number of digit-signals transmitted per second is brought to a value which is the same for every signal in the system. Each synchronising circuit will therefore have to follow a sudden change in the digit-signal rate of an incoming signal whenever the oscillator controlling the rate of the incoming signal is switched from one of its frequencies to the other. There will inevitably be some phase error between the output of the synchronising circuit and the timing of the incoming digit-signals, for a short period after each change. The phase errors will degrade the signal-to-noise ratio, and must not be allowed to become excessive.

It can be shown that the maximum phase error will be $2t(f_1-f_2)/\pi$ where $t$ is the time constant of a typical synchronising circuit and $f_1$ and $f_2$ are the discrete frequencies of a typical oscillator. To keep the signal-to-noise ratio within about 0.1 decibels of its maximum value, the phase error should be kept less than $\pi/15$ radians.

It follows that $2\Delta f<(f_1-f_2)<\pi^2/30t$, where $\Delta f$ is the tolerance on the crystal oscillator frequencies expressed as a fraction of the nominal crystal oscillator frequency. The minimum acceptable value of the time constant $t$ will be determined by the need to maintain synchronisation during period of "fading" in systems where the exchanges are connected by radio links.

It is desirable to ensure that the changes in the digit-signal rate of each signal are sufficiently separated in time to ensure that the synchronising circuit receiving the signal will always substantially attain synchronism with the signal before its digit-signal rate is changed. In other words, any phase error resulting from one transition should have been corrected (or reduced to a comparatively insignificant value) before the next transition occurs. This effect can be achieved by making the frequency-control system insensitive to small phase errors or responsive only to phase errors exceeding a predetermined error. For instance each of the threshold circuits can be arranged to switch into its high-voltage state only when its input rises above a first threshold voltage and to switch into its low-voltage state only when its input falls below a second threshold voltage, the first threshold voltage being greater than the second threshold voltage. The average time interval between transitions can then be increased as required, by increasing the separation between the threshold voltages or by increasing the amplification of the signal applied to the input of the threshold circuit. The capacity of the buffer stores must be large enough to allow the phase error signals to vary over a range extending from appreciably above the first threshold voltage to appreciably below the second threshold voltage.

Figure 2:
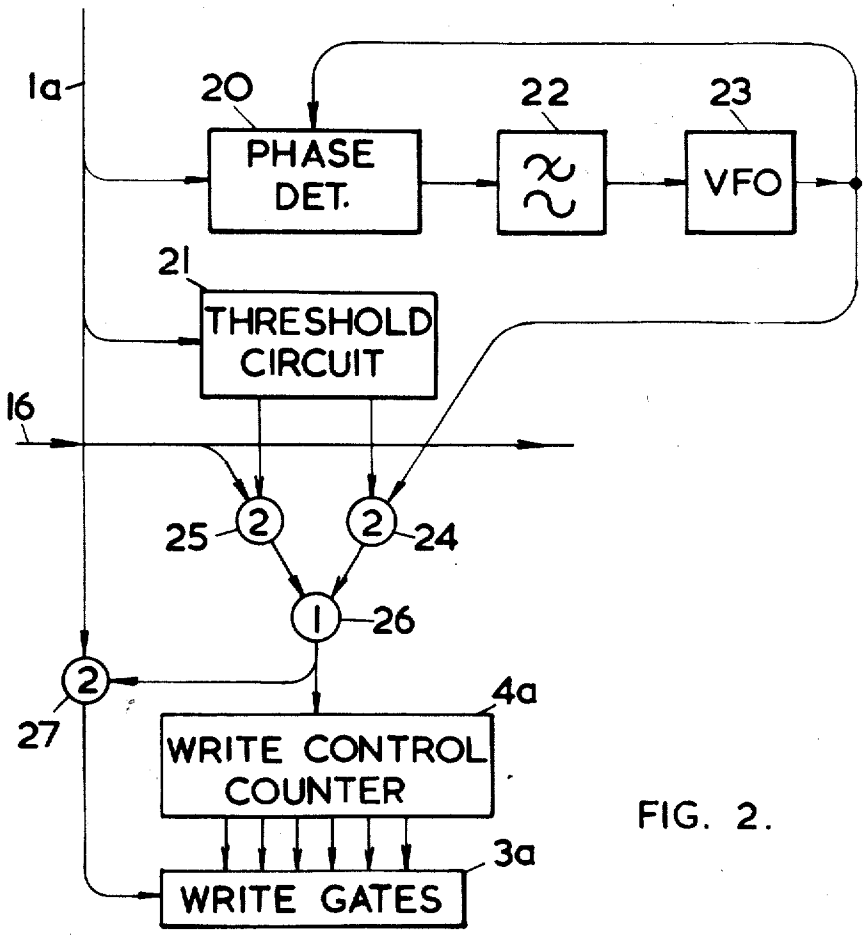
Figure 3:
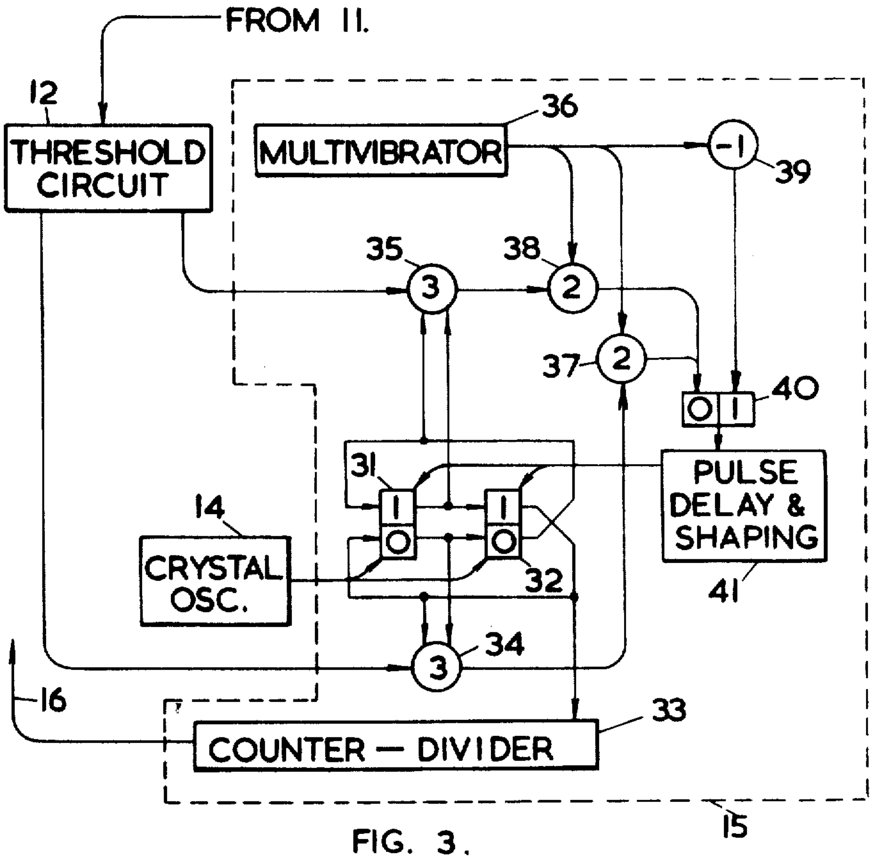

An embodiment of the invention will now be described, by way of example only, with reference to the accompanying drawings, of which:

FIG. 1 is a schematic circuit diagram of synchronising apparatus at an exchange in a complex communications system, and FIGS. 2 and 3 are more detailed schematic circuit diagrams of two different parts of the apparatus of FIG. 1.

The exchange, of which the apparatus shown in FIG. 1 is a part, includes several independent lines 1*a*, 1*b* . . . 1*n*, on which incoming signals from various sources are received. The line 1*a* is connected to inputs of a synchronising circuit 2*a* and a set of gate circuits called the write gates 3*a*. The synchronising circuit 2*a* is connected to drive a write control counter 4*a*, which has separate outputs controlling the write gates 3*a*. Outputs from the write gates 3*a* are connected to separate storage locations in a buffer store 5*a*. Outputs from the locations in the buffer store are connected, through separate gate circuits of a set called the read gates 6*a*, to a common output line 7*a*. The read gates 6*a* are controlled by separate outputs from a read control counter circuit 9. One of the outputs of the read control counter 9 is connected to a 0-state setting input of a bistable element 8*a* and a corresponding one of the outputs of the write control counter 4*a* is connected to a 1-state setting input of the bistable element 8*a*.

The line 1*b* is associated with elements 2*b* to 8*b* inclusive, and the line 1*n* is associated with elements 2*n* to 8*n* inclusive, corresponding to the elements 1*a* to 8*a* inclusive and similarly interconnected. The exchange may include other similar lines and associated sets of elements, not shown in FIG. 1. For each line there will be a separate set of read gates connected to an output line, and a bistable element. Each of the outputs of the read control counter 9 controls corresponding gates in all the sets of read gates 6*a* to 6*n* inclusive. Each of the bistable elements 8*a* to 8*n* inclusive has an output connected to an adder circuit 10.

An output of the adder circuit 10 is connected through a low-pass filter 11 to a threshold circuit 12. Outputs from the threshold circuit 12 and from a crystal oscillator 14 are connected to a divider-counter circuit 15. An output from the divider-counter 15 is carried on a line 16 to the read control counter 9, to a resetting circuit 17, and to each of the synchronising circuits 2*a* to 2*n* inclusive. The resetting circuit 17 is arranged to receive signals from the read control counter 9 and has an output connected through separate switches 18*a* to 18*n* inclusive to the write control counters 4*a* to 4*n* inclusive respectively.

The synchronising circuit 2*a* is arranged to derive pulses synchronised with the digit-signal rate of incoming signals on the line 1*a*, and will normally drive the write control counter 4*a* with these pulses. The write control counter 4*a* is a cyclic counter circuit with outputs which are consecutively energised as the counter is stepped through its cycle by the pulses applied to it. The consecutively energised outputs of the write control counter 4*a* open the write gates 3*a* consecutively, causing the digit-signals of the signal on the line 1*a* to be dealt cyclically into the storage locations of the buffer store 5*a*.

The read control counter 9 is another cyclic counter circuit, with consecutively energised outputs which open the read gates 6*a* in a cyclic sequence, in synchronism with local clock pulses developed on the line 16. The gates 6*a* therefore transmit the digit-signals from the buffer store 5*a* to the output line 7*a* in serial form. The local clock pulses are derived by counting-down from the output of the crystal oscillator 14, but modifications are applied to the counting-down process when necessary to keep the reading and writing processes properly interlaced, as will now be described.

The divider-counter circuit 15 includes a cyclic counter which is driven by pulses from the crystal oscillator 14. The oscillator pulses have a repetition frequency of eight million pulses per second and the divider-counter is generally arranged to produce one output pulse for every counting cycle of thirty-two counted pulses. However, the circuit 15 also includes gate circuits connected to the cyclic counter and controlled by the threshold circuit 12 for modifying the counting cycle so as to either advance or retard the count slightly, according to the state of the threshold circuit 12.

It is obviously desirable that the reading and writing processes should have the maximum possible separation. The actual separation achieved at the buffer store 5*a* is measured by the output of the bistable element 8*a*. This bistable element 8*a* is set when a digit-signal is written into, and reset when a digit-signal is read out of the 6th location of the buffer store 5*a*. Thus its output is a rectangular wave whose duty cycle or mean voltage is a measure of the separation. Signals of similar significance are obtained from the bistable elements 8*a* to 8*n* inclusive; they are added together and averaged by the adder circuit 10 and the filter 11 so that the signal applied to the threshold circuit 12 is a variable direct voltage representing the average of the separations between the reading and writing operations in all of the buffer stores 5*a* to 5*n* inclusive.

Whenever the local oscillator 14 is tending to run faster than the corresponding oscillators at other exchanges or sources which control the digit-signal rates of the incoming signals, the reading operations tend to catch up on the writing operations, and the mean voltages of the outputs from the bistable elements 8*a* to 8*n* tend to decrease. When the separation becomes less than half a cycle of the read control and write control counters, the threshold circuit 12 is put into a low-voltage condition, in which it acts on the divider-counter circuit to retard its counting operations, thereby extending its counting period, reducing the frequency of the clock pulses, and retarding the reading operations.

However, when the writing operations are tending to catch up on the reading operations, the mean voltages on the outputs of the bistable elements 8*a* to 8*n* increase. When the separation becomes less than half a cycle of the read control and write control counters, the threshold circuit 12 is put into a high voltage condition, in which it acts on the divider-counter circuit to advance its counting operations, thereby shortening its counting period, increasing the frequency of the clock pulses, and speeding up the reading operations.

In this way, the local clock pulses on the line 16 at each exchange are repeatedly readjusted to keep their average repetition rates equal to the average of the digit-signal rates of the incoming signals. It can be shown that all the digit-signal rates in the system will tend to settle to an equilibrium frequency, which will lie within a range determined mainly by the frequencies obtainable by the modifications provided for in the divider-counter circuit 15, and which will not depend on the reception of signals from any master oscillator.

The resetting circuit 17 is a simple arrangement for setting up the optimum separation of the reading and writing operations at the beginning of a message. It comprises gate circuits through which a pulse derived from the read control counter 9 can be applied to one or more of the write control counters 4*a* to 4*n*, to reset the write control count therein to a count of one just as the read control counter 9 reaches a count of four. Preferably the resetting circuit gates are made operative by a bistable element set by a switch (not shown) and reset by another pulse from the read control counter 9, so that it will reset the counter once only, whenever the switch is operated.

The divider-counter circuit 15 may be a ring counter circuit with feedback connections which can be altered by opening or closing gate circuits, so as to alter its counting cycle slightly. Alternatively, it may be a simple counter circuit with gate circuits through which extra pulses may be applied to advance or retard the count. It may be arranged so that only a small proportion of the counting cycles are modified, for instance as hereinafter described with reference to FIG. 3.

The synchronising circuits 2*a* to 2*n* may include a differentiating circuit for generating a narrow pulse at each digit-signal crossover, and a high-Q circuit tuned to resonate at the nominal digit-signal rate and excited by the narrow pulses. However, discrepancies between the resonant frequency of the high-Q tuned circuit and the actual digit-signal rate, and jitter due to the noise will tend to cause undesirable phase displacements between the received digit-signals and the output of the synchronising circuit.

In a preferred alternative arrangement, the synchronising circuits 2*a* to 2*n* each include a phase-locked frequency tracking loop, to generate pulse signals at a repetition frequency which is adjusted to follow the digit-signal rate of an incoming signal. A typical synchronising circuit 2*a* of this kind is shown in FIG. 2 together with its connections to the associated line 1*a*, the write control counter 4*a*, the local clock pulse line 16, and the write gates 3*a*.

The line 1*a* is connected to one input of a phase sensitive detector 20 and to a threshold circuit 21. The output of the phase-sensitive detector 20 is connected through a low-pass filter 22 to control a variable-frequency oscillator 23. The output of the variable-frequency oscillator 23 is connected to another input of the phase sensitive detector 20, and to a gate 24. The local clock pulse line 16 is connected to a gate 25. The threshold circuit 21 is arranged to open the gate 24 whenever the signals on the line 1*a* exceed a given strength, and alternatively to open the gate 25 when the signals are less strong. The outputs of the gates 24 and 25 are connected through an or-gate 26 to the input of the write control counter 4*a*.

To improve the signal-to-noise ratio, the line 1*a* is connected to the write gates 3*a* through a strobe gate 27 which is opened by short pulses from the or-gate 26 at times which should coincide with the middle of each incoming digit-signal. This is an optional modification, shown on FIG. 2 but not on FIG. 1.

The components 20, 22 and 23 form a phase-locked loop, which produces an output following the digit-signal rate of the incoming signal and synchronised with it. Normally, while a strong signal is being received, the output of the loop is passed through the gates 24 and 26 to control the writing operations. However, when the signal is weak and the operation of the loop is in consequence liable to be perturbed by noise, the threshold circuit 21 switches control to the local clock pulses. This will usually occur only during short periods of "fading"; it keeps the reading and writing operations in step and approximately synchronised with the incoming digit-signals until the signal strength recovers.

FIG. 3 shows one possible form of the divider-counter circuit 15 with its connections to the threshold circuit 12 and the crystal oscillator 14. Two bistable elements (J–K flip-flops) 31 and 32 are connected to form a ring counter which is stepped round a cycle of four stages by pulses from the crystal oscillator 14. Complementary outputs of the element 31 are connected to the inputs of the element 32 and the outputs of the element 32 are cross-coupled to the inputs of the element 31. An output from the element 32 is connected to a further counter-divider circuit 33 which consists of three conventional binary counter stages. The last of these stages is connected to supply local clock pulses to the line 16. Outputs from the 0-state of the element 31 and the 1-state of the element 32 are connected to inputs of a three-input and-gate 34. Outputs from the 1-state of the element 31 and the 0-state of the element 32 are connected to inputs of a three-input and-gate 35. The threshold circuit 12 has outputs connected to the third inputs of the gates 34 and 35; it is arranged to open the gate 34 when in its low-voltage condition, and to open the gate 35 in its high-voltage condition.

A multivibrator circuit 36 has an output connected to inputs of two and-gates 37 and 38 and an inverter circuit 39. The output of the gate 34 is connected to the gate 37, and the output of the gate 35 is connected to the gate 38. A bistable element 40 has a 1-state setting input connected to the inverter 39 and a 0-state setting input connected to receive the outputs of the gates 37 and 38. An output from the bistable element 40 is arranged to apply a pulse to a pulse delay and shaping network 41 whenever the bistable element 40 is switched to its 0-state. An output from the network 41 is connected to 1-state setting connections of the bistable elements 31 and 32.

In operation, when the gates 37 and 38 are closed, the elements 31 and 32 are stepped through a sequence of four conditions thus:

| | Element 31 | Element 32 |
|---|---|---|
| 1st step | 0 | 0 |
| 2nd step | 1 | 0 |
| 3rd step | 1 | 1 |
| 4th step | 0 | 1 |
| 1st step of next cycle | 0 | 0 |

The crystal oscillator 14 provides eight million pulses per second, and the normal action of the elements 31 and 32 applies one pulse to the counter-divider 33 for every four oscillator pulses. The counter-divider 33 emits one pulse for every eight pulses applied to it, and therefore the pulses on the line 16 would normally occur at a rate of 250,000 pulses per second.

When the threshold circuit 12 is in its high-voltage condition, the gate 35 produces an output pulse during every 2nd step of the sequence. In every positive-going half-cycle of the output of the multivibrator 36, the first of these pulses to occur switches the bistable element 40 to its 0-state, causing a short pulse from the network 41 to advance the count to the 3rd step. Subsequent pulses during the same half-cycle have no effect. The multivibrator 36 has a square-wave output of frequency 1600 cycles per second, so that 250,050 pulses per second now occur on the line 16. These pulses are not all exactly equispaced; about one pulse in every 156 pulses is slightly advanced.

When the threshold circuit 12 is in its low-voltage state, the gate 34 produces an output pulse during every 4th step of the sequence. In every positive-going half-cycle of the output of the multivibrator 36, the first of these pulses to occur switches the bistable element 40 to its 0-state, causing a short pulse from the network 41 to return the count to the 3rd step. Subsequent pulses during the same half-cycle have no effect. In this case, the action slightly retards about one pulse in every 156 clock pulses, and 249,950 pulses per second now occur on the line 16.

I claim:

1. Synchronising apparatus for an exchange in a digital communications system, comprising:

receiving means for receiving a plurality of incoming digital messages, a plurality of electronic buffer stores each associated with a separate one of the incoming digital messages, and each having a plurality of digit-signal storage locations, a plurality of writing means all connected to the receiving means, and each connected to a separate one of the said buffer stores for writing each message into the associated buffer store at a writing rate synchronised with the digit-signal rate of the message, a local oscillator circuit, reading means connected to the local oscillator circuit and to the buffer stores for reading the messages from the buffer stores at a rate controlled by the local oscillator circuit, and having a separate output line corresponding to each one of the buffer stores, a plurality of relative-time measuring means all connected to the reading means, and each connected to a separate one of the writing means for producing an error signal dependent on the relationship between the times of the writing and the reading operations on a given part of the buffer store connected to the said one of the writing means, averaging means connected to the relative-time measuring means, for averaging the error signals to produce a mean-error signal, and control means connected to the averaging means and to the local oscillator circuit and responsive to the mean-error signal to shift the frequency of the local oscillator circuit to different discrete frequencies according to the magnitude of the mean-error signal, so as to tend to bring the said magnitude nearer to a predetermined magnitude.

2. Apparatus as claimed in claim 1 and wherein the control means comprises:

a mean-eror sensitive threshold circuit connected to the averaging means to receive the mean-error signal, and frequency-setting means connected to the said mean-error sensitive threshold circuit and responsive thereto for setting the frequency of the local oscillator circuit to a first frequency whenever the voltage of the mean-error signal becomes greater than a first threshold voltage of the threshold circuit and for setting the frequency of the local oscillator circuit to a second frequency whenever the voltage of the mean-error signal becomes less than a second threshold voltage of the threshold circuit.

3. Apparatus as claimed in claim 2 and wherein the local oscillator circuit comprises:

an oscillator for generating pulse signals at a repetition frequency at least four times greater than the nominal digit-signal rate of the incoming messages, and a counter circuit connected to the oscillator so as to operate as a divider to produce read-control pulses at a repetition frequency not greatly different from the nominal digit-signal rate of the incoming messages, and wherein the frequency-setting means comprises means connected to the said mean-error sensitive threshold circuit and to the counter circuit for altering the timing and repetition rate of the said read-control pulses.

4. Apparatus as claimed in claim 3 and wherein the control means also comprises:

a multivibrator circuit which is operative at a rate considerably less than the nominal digit-signal rate of the incoming signals, and is connected to the frequency-setting means to control it so that the read-control pulses are altered intermittently by alterations synchronised with the action of the multivibrator circuit.

5. Apparatus as claimed in claim 1 and wherein each of the said writing means comprises:

a synchronising means for detecting the digit-signal rate of an incoming signal and producing a train of write-control pulses synchronised therewith, a write control counter circuit connected to the synchronising means so as to be driven by the write-control pulses, and having a plurality of outputs consecutively energised in a cyclic sequence, a plurality of write gates all connected to the receiving means and each connected to a separate one of the storage locations of the buffer store, and to a corresponding one of the outputs of the write control counter so as to allow consecutive digit-signals of an incoming signal to be written into consecutive storage locations of the buffer store;

and wherein the reading means comprises:

a read control counter circuit connected to the local oscillator circuit and having a plurality of outputs consecutively energised in a cyclic sequence, a plurality of sets of read gates, of which each set of read gates is connected to a separate one of the buffer stores, and to the corresponding output line of the reading means, and consecutive gates of each set are connected to consecutively energised outputs of the read control counter, and a resetting means connected to the read control counter circuit and to each of the write control counter circuits for causing the write control counter circuits to be reset by an output of the read control counter circuit to achieve a predetermined separation between the times of the writing and the reading operations on a given location of one of the buffer stores.

6. Apparatus as claimed in claim 5 and wherein each of the relative-time measuring means comprises:

a bistable element having a setting input connected to an output of the write control counter circuit of the associated writing means, a resetting input connected to a corresponding output of the read control counter circuit, and an output, and a low-pass filter circuit connected to the output of the bistable element.

7. Apparatus as claimed in claim 5 and wherein each synchronising means comprises a phase-locked tracking means.

8. Apparatus as claimed in claim 5 and wherein each of the said writing means also comprises a message-sensitive threshold circuit connected to the receiving means and gate circuit means connected to the local oscillator circuit, the synchronising means, the write control counter circuit and the message-sensitive threshold circuit, for applying the write-control pulses from the synchronising means to the write control counter whenever the signals forming the incoming message are stronger than a predetermined strength and for applying pulses from the local oscillator circuit to the write control counter whenever the signals forming the incoming message are weaker than the said predetermined strength.

(References on following page)

References Cited

UNITED STATES PATENTS

| | | |
|---|---|---|
| 3,013,120 | 12/1961 | Wright. |
| 3,051,929 | 8/1962 | Smith. |
| 3,134,962 | 5/1964 | Froehlich. |
| 3,188,569 | 6/1965 | Mahony. |
| 3,209,332 | 9/1965 | Doersam. |
| 3,229,259 | 1/1966 | Barker et al. |
| 3,250,897 | 5/1966 | Vasu et al. |
| 3,266,024 | 8/1966 | Kersey et al. |
| 3,289,014 | 11/1966 | Fuss. |
| 3,350,689 | 10/1967 | Underhill et al. |
| 3,366,737 | 1/1968 | Brown. |

PAUL J. HENON, Primary Examiner

U.S. Cl. X.R.

178—69.5; 179—15